No. 851,154. PATENTED APR. 23, 1907.
P. A. BLAIR.
ATTACHMENT FOR VEHICLES.
APPLICATION FILED SEPT. 14, 1906.
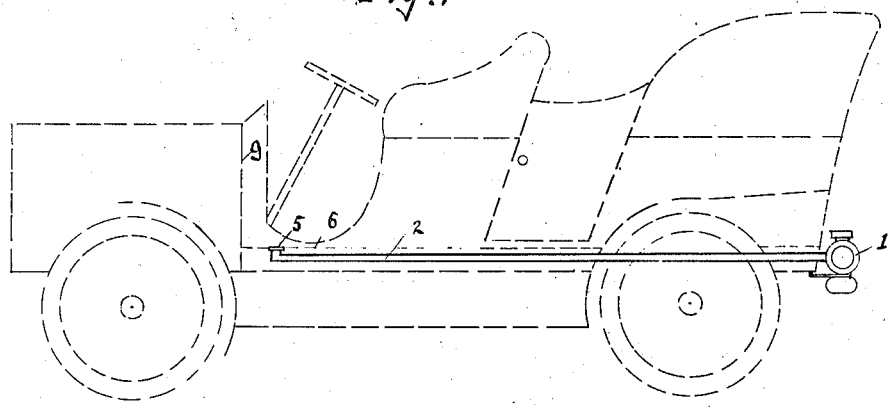
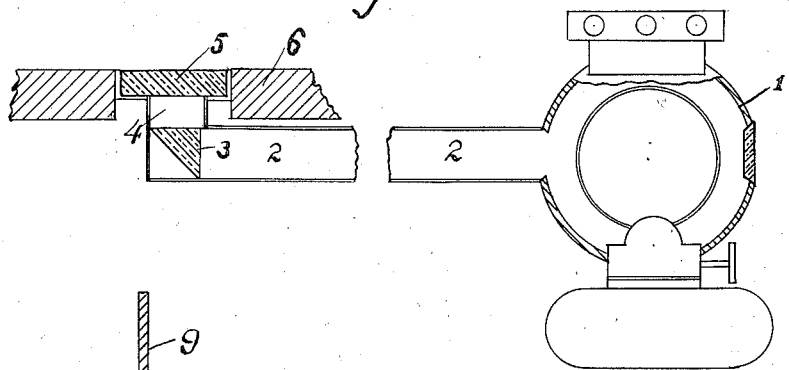
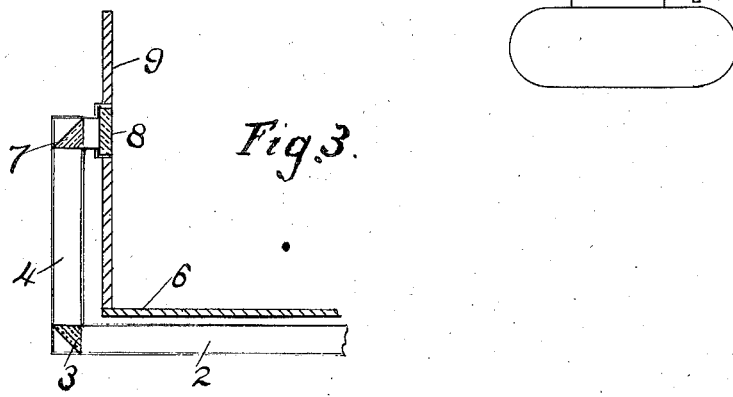
Witnesses
Walter Collier
A. E. Powell
Inventor
Paul A. Blair.

UNITED STATES PATENT OFFICE.

PAUL A. BLAIR, OF WATERBURY, CONNECTICUT.

ATTACHMENT FOR VEHICLES.

No. 851,154.　　　　Specification of Letters Patent.　　　　Patented April 23, 1907.

Application filed September 14, 1906. Serial No. 334,697.

*To all whom it may concern:*

Be it known that I, PAUL A. BLAIR, a citizen of the United States, residing at Waterbury, in the county of New Haven and State of Connecticut, have invented certain new and useful Improvements in Attachments for Vehicles, of which the following is a specification.

My invention relates to an attachment for vehicles and especially motor cars, automobiles and the like.

As is well known to those possessing automobiles, the rear lamp which is primarily for the purpose of illuminating the license number at the back of the car, frequently goes out unknown to the person driving the car, and such an accident, in most places, immediately subjects the occupants to arrest and a heavy fine.

It is, therefore, the main object of this invention to provide a device whereby the chauffeur or driver can easily see by the illumination of a dial or signal plate before him whether or not the rear light is burning without leaving his seat.

In the accompanying drawings,—Figure 1 is an indicated view of a motor car with my attachment shown in full lines applied thereto; Fig. 2 is an enlarged detail view of the attachment; and Fig. 3 is a similar view of a modification.

Referring to these drawings in detail, 1 represents the rear lamp which may be of any well known construction and supported in the usual manner at the back of the vehicle or car. Most of these lamps are provided at the sides with colored lights. The glass is removed, or an opening made if necessary, in the side of the lamp next to the car, and connecting therewith is a tube or conduit 2 or the like running preferably beneath the floor of the car to a point in front of the chauffeur's seat. At this point, the tube 2 makes an upward turn or bend substantially at right angles and is provided with a prism 3 or other suitable means such as an inclined mirror for transmitting or reflecting the ray of light from the lamp upwardly. Above this prism or mirror is a short tube 4 at the end of which is a covering 5 of either transparent or translucent material, as ground glass forming a light emitting or visual signal means. This glass or signal plate is preferably flush with the floor of the car, although, if desired, the modification shown in Fig. 3 may be used. In this case, the tube 2 extends further to a point near the rear wall of the engine casing or hood before it makes its upward turn. It is provided with a prism 3 or the like, as in Fig. 2, above which, in the tube 4, is another prism or mirror 7, which, in turn, transmits the ray of light to an opening which is preferably covered by a similar glass signal plate 8 or the like located in the rear wall 9 of the engine hood directly in front of the chauffeur.

From this description and the accompanying drawing, it is readily seen that sufficient light will be reflected or transmitted to this plate signal means or opening to be clearly distinguishable in the surrounding darkness of the evening, yet not enough to be objectionable to the eyes of the person driving, and obviously so long as the rear light burns the plate will be illuminated.

I claim as my invention—

1. The combination with a vehicle, of a rear light thereon, a visual signal located at the front of the vehicle, and means adapted to transmit light from said rear light to said front visual signal, whereby the driver of the vehicle is advised of the burning or extinguishment of said rear light and without leaving his seat.

2. The combination with a vehicle, a rear light thereon a visual signal located at the front thereof and in full view of the driver, and means adapted to transmit the light from said rear light to said front visual signal comprising a light-conducting conduit having at each of its bent portions means to cause the light rays to be transmitted through said conduit, whereby the driver of the vehicle is advised whether the rear light is burning and without leaving his seat.

3. In combination, a vehicle provided with a lamp out of view from the driver's seat, visual signaling means mounted in view of the driver, and a light transmitting conduit mounted upon the body of said vehicle and adapted to transmit light from said lamp to said visual signaling means whereby the extinguishment of the lamp is evidenced at said signaling means.

4. The combination with a vehicle, of a rear lamp thereon, a signal plate located near the front of the vehicle, and means adapted to transmit light from said rear lamp to said front signal plate, whereby the driver of the vehicle is advised of the burning or extinguishment of said rear lamp without leaving his seat.

5. The combination with a vehicle, of a rear lamp thereon, a translucent signal plate located near the front of the vehicle in view of the driver, and means terminating at one end adjacent to the lamp adapted to transmit light from said lamp to said signal plate, whereby the driver of the vehicle is advised of the burning or extinguishment of said rear lamp without leaving his seat.

6. In automobile construction, in combination, a rear lamp out of view from the driver's seat, visual signaling means mounted upon the hood of the vehicle in view of the driver, and a light transmitting conduit leading from said lamp to said visual signaling means whereby the extinguishment of the lamp is evidenced at said signaling means.

In testimony whereof I have signed my name to this specification in the presence of two subscribing witnesses.

PAUL A. BLAIR.

Witnesses:
C. W. FOWLER,
WALTER COLLIER.